US012242331B2

(12) United States Patent
Agrawal et al.

(10) Patent No.: US 12,242,331 B2
(45) Date of Patent: Mar. 4, 2025

(54) METHOD AND APPARATUS FOR DETERMINING CONTROLLER AREA NETWORK (CAN) BUS LOADING

(71) Applicant: NXP USA, Inc., Austin, TX (US)

(72) Inventors: Rahul Agrawal, Vasundhra Enclave (IN); Pradeep Singh, Greater Noida West (IN); Devendra Bahadur Singh, Lucknow (IN); Arun Kumar Barman, Faridabad (IN)

(73) Assignee: NXP USA, Inc., Austin, TX (US)

( * ) Notice: Subject to any disclaimer, the term of this patent is extended or adjusted under 35 U.S.C. 154(b) by 122 days.

(21) Appl. No.: 18/158,686

(22) Filed: Jan. 24, 2023

(65) Prior Publication Data

US 2024/0176690 A1 May 30, 2024

(30) Foreign Application Priority Data

Nov. 29, 2022 (IN) ............................ 202221068835

(51) Int. Cl.
*G06F 11/07* (2006.01)
*H04L 12/40* (2006.01)

(52) U.S. Cl.
CPC ...... *G06F 11/0784* (2013.01); *H04L 12/4013* (2013.01); *H04L 2012/40215* (2013.01); *H04L 2012/40273* (2013.01)

(58) Field of Classification Search
CPC ......................... G06F 11/0784; H04L 12/4013
See application file for complete search history.

(56) References Cited

U.S. PATENT DOCUMENTS

| | | | | |
|---|---|---|---|---|
| 10,083,071 | B2 | 9/2018 | Sonalker et al. | |
| 2013/0287922 | A1 | 10/2013 | Ganjyal | |
| 2015/0055473 | A1* | 2/2015 | Moriya | H04L 12/40006 370/235 |
| 2018/0287922 | A1* | 10/2018 | Hirata | H04L 12/40169 |

FOREIGN PATENT DOCUMENTS

| | | | |
|---|---|---|---|
| CN | 105141447 | A | 12/2015 |
| CN | 111211954 | A | 5/2020 |
| CN | 111464396 | A | 7/2020 |
| CN | 113691432 | A | 11/2021 |
| EP | 3113529 | B1 | 9/2020 |

OTHER PUBLICATIONS

Vector, "CAN Bus Load Calculation," downloaded from the internet Nov. 28, 2022, https://support.vector.com/kb?id=kb_article_view&sysparm_article=KB0012332, 3 pages.

* cited by examiner

*Primary Examiner* — David E Martinez

(57) ABSTRACT

A controller area network (CAN) node is described for determining a bus load on a CAN bus. An indication of a time window duration of a time window is received by the CAN node and a start time for determining a bus load and an end time based on the start time and the time window duration is defined. The bus load is based on determining whether the CAN bus is active for each bit of one or more bits detected on the CAN bus between the start time and the end time. The bus load is compared to a threshold range. A signal is sent to a host processor if the bus load exceeds or falls below the threshold range.

22 Claims, 6 Drawing Sheets

METHOD AND APPARATUS FOR DETERMINING CONTROLLER AREA NETWORK (CAN) BUS LOADING

FIELD OF THE DISCLOSURE

This disclosure generally relates to operations of a controller area network (CAN) bus, and more particularly to determining CAN bus loading of the CAN bus.

BACKGROUND

Controller area network (CAN) protocol allows CAN nodes of a CAN bus to communicate with each other. The CAN protocol operates based on an International Standardization Organization (ISO) defined serial communications bus standard. A CAN network is defined by an arrangement of one or more of the CAN nodes coupled to one or more of the CAN buses which operate in accordance with the CAN protocol.

Figure 1:
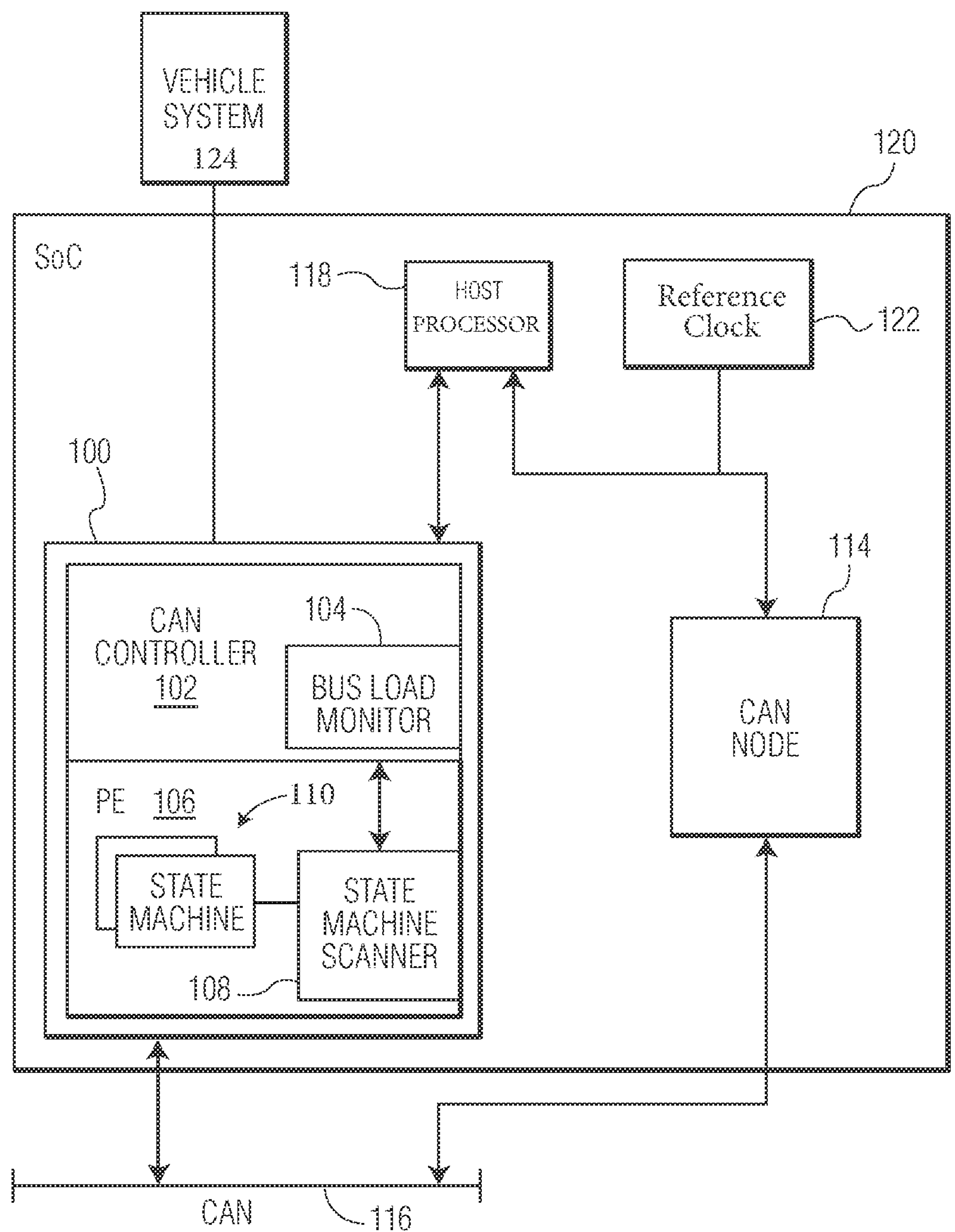
FIG. 1 is an example block diagram of a controller area network (CAN) node which is coupled to a CAN bus in accordance with an embodiment.

The drawings are for the purpose of illustrating example embodiments, but it is understood that the embodiments are not limited to the arrangements and instrumentality shown in the drawings.

DETAILED DESCRIPTION OF EMBODIMENTS

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview

A controller area network (CAN) bus carries CAN frames transmitted by a CAN node of the CAN bus to one or more other CAN nodes on the CAN bus. In a vehicle, a bus load of the CAN bus is typically determined based on information of detected frames provided by a CAN node on the CAN bus which is not coupled to any vehicle system. The CAN node detects presence or absence of CAN frames on the CAN bus and provides the information of the detected frames to a host processor. The information provided includes, for example, a message identification which indicates a priority of the detected frame, a frame type which indicates a format of the detected frame such as a Classic, FD (flexible data rate), or XL (extra long) frame type defined by a CAN standard, a data length code (DC), and data bits of the frame. In some examples, the CAN frame detected is a CAN bus error frame and the information includes a type of the error. The type of error might include one or more of an acknowledgement error of the frame, a bit error which is a bit that is transmitted by a source device differing from the bit which is received at the source device, a stuff error indicating a stuffing which violates a stuff rule, a frame error which corresponds to an improper frame format, or a cyclic redundancy check (CRC) error. The CAN node provides the information of the detected frame to the higher level software of the host processor. The host processor receives the information and estimates the total number of bits detected on the CAN bus corresponding to a CAN frame based on the information provided. Because the CAN node communicates with higher level software of a host processor with a limited bandwidth, the information that is provided to the host processor is not enough for the host processor to determine the actual number of bits detected on the CAN bus corresponding to CAN frames. Further, estimates of a number of stuff bits or bits of the CAN bus error frame detected on the CAN bus, for example, might not be correct. The inaccuracy in the number of bits affects accuracy of the determination of the bus load and because of this inaccuracy, the CAN bus is conventionally underutilized for communication.

Embodiments disclosed herein are directed to a bus load monitor in a CAN node for determining bus load on the CAN bus which is accurate to bit level compared to conventional bus load determination methods based on received frames. The CAN node is arranged to not only itself transmit and receive CAN frames on the CAN bus but also itself determine the bus load on the CAN bus which is provided to the host processor. The CAN node has a protocol engine (PE) and a bus load monitor. The PE comprises one or more state machines which indicate whether one or more bits detected on the CAN bus correspond to a CAN frame. A state machine scanner snoops the one or more state machines and based on the snooping provides one or more indications to a control signal generator of the one or more bits detected on the CAN bus and for each bit of the one or more bits detected whether the bit corresponds to a CAN frame. For example, the one or more indications identify that a particular field, a stuff bit, or a CRC of a CAN frame was detected or a string of bits was detected after an end of a CAN frame. The control signal generator uses the one or more indications and determines for each of the one or more bits detected whether the CAN bus is active or idle. The CAN bus is active for a respective bit time interval if a bit detected corresponds to a CAN frame and idle otherwise. The control signal generator then provides one or more indications of whether the CAN bus is active or idle for each of the detected one or more bits to the bus monitor. The bus monitor receives similar one or more indications from the control signal generator 206 for one or more other groups of one or more bits detected over a period of time in a time window and determines a bus load of the CAN bus for the time window. In an example, the CAN bus is active when a CAN frame bit is detected on the CAN bus or idle when no CAN frame bit is detected on the CAN bus. A time when the CAN bus is active in the time window is determined along with an average time which the CAN bus is active over a plurality of time windows. In an example, the bus load is indicated by a percentage such that 100% indicates a maximum load on the CAN bus where the CAN bus is active for 100% of the time window or plurality of time windows and 0% indicates no load on the CAN bus and the CAN bus is idle for the time window or plurality of time windows. If the bus load exceeds a threshold amount, then the bus load monitor generates an interrupt to the host processor. Further, if the bus load falls below a threshold amount, the bus monitor generates an interrupt to the host processor that might indicate that a CAN node is no longer connected the CAN bus or is failing. In examples, the disclosed bus load monitor avoids a need for an extra CAN node not coupled to any vehicle system to measure bus load, saving area on a system on a chip (SoC), pin count on the SoC, and host bandwidth and improves accuracy of determining the bus load. The determined bus load also allows for monitoring intrusion detection on the CAN bus, identifying CAN nodes which might be malfunctioning and not transmitting frames, or identifying CAN nodes which do not fairly allow other CAN nodes to transmit frames. Well known instructions, protocols, structures, and techniques have not been shown in detail in order not to obfuscate the description.

Example Systems

FIG. 1 is an example block diagram of a controller area network (CAN) node 100 which is coupled to a CAN bus 116 in accordance with an embodiment. A CAN bus 116 operates based on an International Standardization Organization (ISO) defined serial communications bus which implements a protocol to allow CAN nodes to communicate with each other. In an example, a CAN node may be coupled to a vehicle system 124 of a vehicle and the CAN bus 116 may facilitate communication by another CAN node coupled to another vehicle system 124. For example, an engine vehicle system of the vehicle may be coupled to one CAN node and a transmission vehicle system of the vehicle may be coupled to another CAN node which communicate with each other over the CAN bus 116. The CAN protocol is a carrier-sense, multiple-access (CSMA) protocol with collision detection and arbitration on message priority (CSMA/CD+AMP). CSMA means that each node on the CAN bus must wait for an idle period before attempting to send a frame comprising a plurality of bits. CD+AMP means that collisions are resolved through a bit-wise arbitration, based on a preprogrammed priority of each frame in an identifier field of the frame. The higher priority identifier always wins bus access.

The vehicle typically has multiple CAN buses an example which is the CAN bus 116, and multiple CAN nodes coupled to a CAN bus to form a CAN network. Further, the CAN node 100 may be arranged on an system on a chip (SoC) 120 which includes one or more additional CAN nodes, an example which is shown as CAN node 114. The one or more CAN nodes may be communicatively coupled to the CAN bus 116 by an CAN interface (not shown) which might include one or more terminals such as pins or solder joints in an example. In an example, "communicatively coupled" may indicate that a communication mechanism such as a bus structure and associated protocol may facilitate communication between one or more components. The SoC 120 may also have a host processor 118 and a reference clock 122 such as an oscillator or crystal which maintains a timing of the SoC 120 by outputting a clock signal with pulses at a defined frequency. The host processor 118 may include any type of processing device and support functions, such as a central processing unit (CPU) or the like coupled to memory (not shown) and a host bus (not shown) for interfacing each of the CAN buses. The host processor 118 generally performs configuration and reconfiguration functions for setting up CAN networks, revising or updating CAN networks, and status monitoring of the network configuration and communications. The host processor 118, the CAN node 100, and the reference clock 122 may be communicatively coupled together and have circuitry such as one or more of analog circuitry, mix signal circuitry, memory circuitry, logic circuitry, and processing circuitry that executes code stored in a memory that when executed by the processing circuitry performs the disclosed functions, among other implementations.

The CAN node 100 (and similarly CAN node 114) may further include a plurality of circuits including a CAN controller 102 and a protocol engine (PE) 106. The PE 106 implements the CAN protocol to facilitate communication of frames on the CAN bus 116. In an example, the PE 106 may be communicatively coupled to the CAN bus 116. In the CAN protocol, a PE of a CAN node may transmit frames in a broadcast mode and one or more CAN node on the CAN bus 116 (e.g., on a same or different SoC and referred to as destination devices) with a respective PE may be arranged to receive frames. The PE 106 may transmit data from the vehicle system 124 in a CAN frame with one or more fields and adding stuff bits to the data at a frequency defined by the CAN protocol, for an example in case of dynamic stuffing one bit is added with inverted polarity after every 5 consecutive bits of a same polarity. The CAN controller 102 may facilitate operation of the PE 106 including a timing of when the PE transmits and receives frames on the CAN bus 116 based on the CSMA and arbitration process.

Multiple CAN nodes on the CAN bus 116 may access the CAN bus 116 and transmit or receive CAN frames on the CAN bus 116. A bus load is an indication of usage of the CAN bus 116 to transmit/receive bits. The bus load may be indicated by an amount of time that the CAN bus is active in carrying frame bits in a period of time versus being idle and not carrying any frame bits in the period of time. In another example, the bus load may be indicated by a percentage which ranges from 0% to 100% such that 100% indicates a maximum load on the CAN bus 116 where the CAN bus 116 is active for 100% for a period of time and 0% indicates no load on the CAN bus 116 and the CAN bus 116 is idle for the period of time.

Embodiments disclosed herein are directed to a bus load monitor 104 of the CAN node 100 which determines bus load accurate to bit level compared to conventional bus load determination methods based on received frames. Further, the CAN node is itself transmitting and receiving CAN frames on the CAN bus 116. The PE 106 may have a state machine scanner (SMS) 108 and the CAN controller 102 may have a bus load monitor 104 to determine the bus load. As described in further detail below, the SMS 108 may provide one or more indications of whether frame bits of a CAN frame are detected on the CAN bus 116 and corresponding one or more indications based on the one or more indications of whether frame bits of the CAN frame are detected on the CAN bus 116 are provided to the bus load monitor 104 which measures the bus load based on the indications from the SMS 108. The bus load is an indication of how long the CAN bus 116 is active, e.g., frame bits detected on the CAN bus 116 in a time window compared to the CAN bus 116 being idle, e.g., when no frame bits are detected in the time window. The bus load monitor 104 may provide the indication of the bus load to the host processor 118.

While a CAN node is transmitting a frame, any other CAN node needs to wait until the transmission is done before the other CAN node is able to transmit on the CAN bus 116. Further, those CAN nodes that needs to transmit a higher priority frames will get access to the CAN bus 116 before CAN nodes that need to transmit lower priority frames. A bus load which exceeds a threshold amount suggests that there is a CAN node which might be sending frames with higher priority and preventing other CAN nodes from transmitting lower priority frames. Alternatively, there may be a CAN node that is unexpectedly re-transmitting due to some error on a CAN bus 116 or the CAN bus 116 is being corrupted by an unwanted external source. This might indicate an error condition on the CAN bus 116 and a CAN node is not obtaining a fair share of access to the CAN bus 116. Conversely, if the bus load falls below a threshold amount, a CAN node might no longer be connected the CAN bus 116 or is failing. Based on the bus load which is indicated, the host processor 118 may take an appropriate action, examples which might include to enable or disable CAN nodes on the CAN bus 116, interrogate the vehicle system for a possible anomaly, or change a CAN node configuration on the CAN bus 116.

The SMS 108 may snoop the PE 106 which communicates with the CAN bus 116 to determine whether each bit of one or more bits detected on the CAN bus 116 correspond to a CAN frame.

The PE 106 may detect whether each bit of the one or more bit detected on the CAN bus 116 correspond to a CAN frame based on one or more state machines 110 of the PEE 106. In an example, one or more states of the state machines 110 may indicate whether a bit of the one or more bits detected is associated with a CAN frame, for example, by identifying one or more of a message identification which indicates a priority of the frame, a frame type which indicates a format of the message such as a Classic, FD (flexible data rate), or XL (extra long) frame type defined by a CAN standard, a data length code (DLC), data bits, and stuff bits of the CAN frame. In some examples, the type of CAN frame may be a CAN bus error frame and the information includes a type of the error which might include one or more of an acknowledgement error of the frame, a bit error which is a bit that is transmitted by a source device differing from the bit which is received at the source device, a stuff error indicating a stuffing which violates a stuff rule, a frame error which corresponds to an improper frame format, or a cyclic redundancy check (CRC) error. The state machine scanner 108 may scan the states of the one or more state machines 110 (e.g., snoop) and cause one or more indications whether the CAN bus 116 is idle or active for each bit detected on the CAN bus 116 to be provided to the bus load monitor 104 which determines bus load of the CAN bus 116. The CAN bus 116 is active if a bit detected corresponds to a CAN frame and idle otherwise.

In an example, the host processor 118 may define a size of a time window which is provided to the bus load monitor 104. The bus load monitor 104 may receive one or more indications within the time window and the bus load monitor 104 may provide an indication of bus load to the host processor 118 in the time window. Further, the bus load monitor 104 may detect that the bus load exceeds a threshold amount and signal the host processor 118, which in an example may be an interrupt signal to the host processor 118. The threshold amount may include one or more of a lower threshold and an upper threshold. If a bus load is below the lower threshold, the bus load may be low because a CAN node might not be able to access the CAN bus 116. If a bus load is above the upper threshold, the bus load may be high due to an anomaly on the CAN bus 116 such as a CAN node malfunctioning or there is an intruding external device transmitting on the CAN bus 116. Based on the interrupt signal, the host processor 118 may take an appropriate action such as performing a security function to remove a CAN node from a CAN bus 116 in the case of a high bus load or performing a diagnostic function of a CAN node which may be malfunctioning in the case of a low bus load.

The disclosed bus load monitor 104 avoids a need for an extra CAN node which is not coupled to any vehicle system 124 to determine bus load, saving area on the SoC 120 and pins, solder balls, or terminals to connect the extra CAN node 100 to the CAN bus 116 by the CAN interface. The CAN node 100 with the bus load monitor 104 also reduces host bandwidth associated with having to transmit or receive information to the host processor 118 for the host processor 118 and processing load on the host processor 118 to estimate the bus load. The disclosed embodiment provides an accurate determination of the bus load to the host processor 118 which is based on translating actual bits of CAN frames detected on the CAN bus to an indication of whether the CAN bus 116 is idle or active to determine the bus load. The CAN node determines the bus load while also facilitating communication by a vehicle system 124 in a vehicle, compared to the extra CAN node not coupled to any vehicle system arranged to provide the host processor 118 with information which the host processor 118 uses to estimate the bits transmitted.

Figure 2:
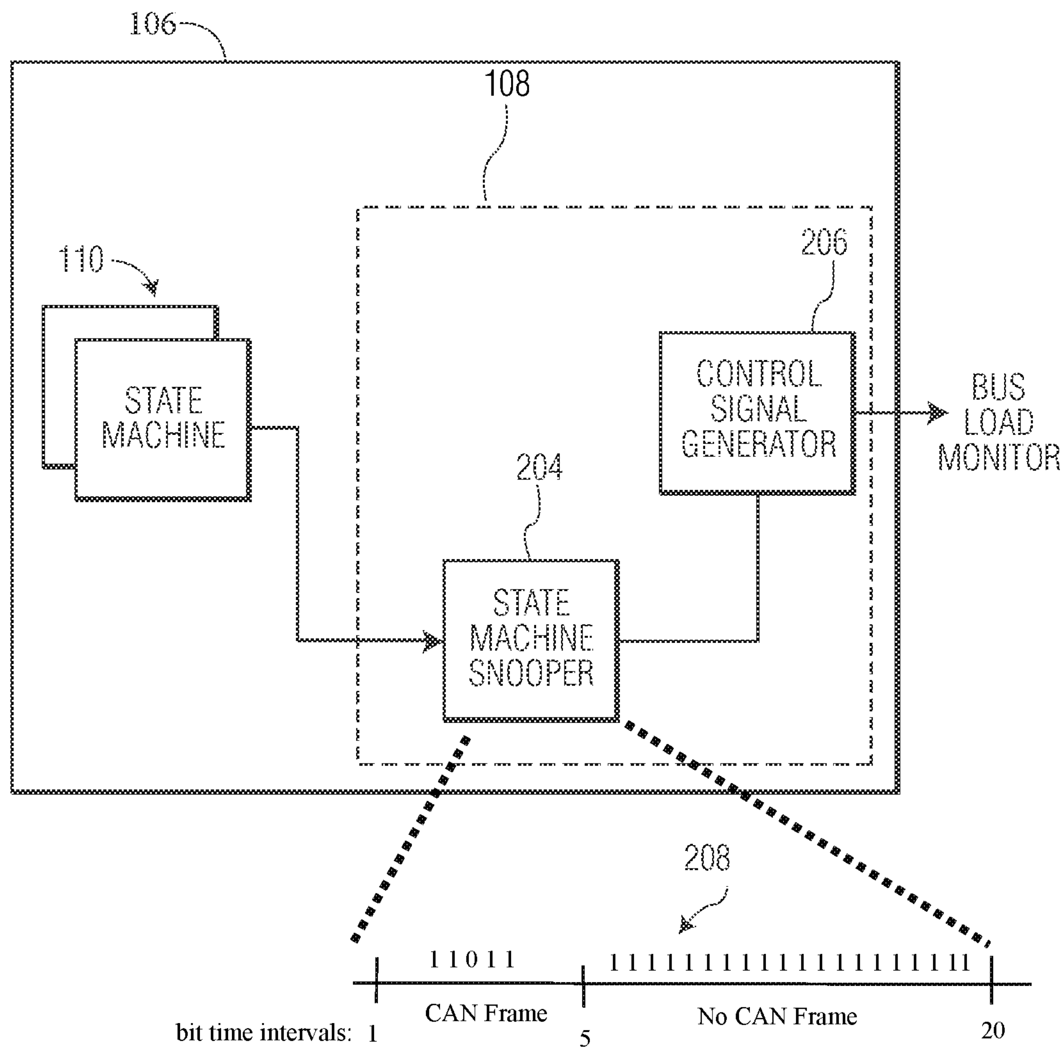
FIG. 2 is an example block diagram of a state machine scanner in a protocol engine (PE) of the CAN node in accordance with an embodiment.

FIG. 2 is an example block diagram of the state machine scanner (SMS) 108 in the PE 106 of the CAN node 100 in accordance with an embodiment. The SMS 108 may have a state machine snooper 204 and a control signal generator 206 which are communicatively coupled together in an example. The state machine snooper 204 which is further in communication with the one or more state machines 110 snoops one or more states of the one or more state machines 110 at a baud rate of the CAN bus 116. The one or more states may indicate whether or not a bit detected by the PE 106 correspond to a CAN frame. In an example, the determination of whether a bit of one or more bits detected on the CAN bus 116 corresponds to a CAN frame may be based on one or more states of the one or more state machines 110 indicating whether the bit detected is in a CAN frame or is not in a CAN frame. The state snooper 204 may provide to the control signal generator 206 one or more indications of whether each bit of the one or more bits detected correspond to a CAN frame based on snooping the states. For example, the one or more indications indicate that a particular field, a stuff bit, or a CRC of a CAN frame was detected and corresponds to a CAN frame or a string of bits was detected after an end of a CAN frame and does not correspond to a CAN frame. The control signal generator 206 may determine from the one or more indications from the state snooper 204 whether the CAN bus 116 is idle or not for each detected bit. In an example, the CAN bus 116 is idle for a bit if the one or more indications indicates that the bit does not correspond to a CAN frame (e.g., a string of N bits which are "1" after a CAN frame) and the CAN bus 116 is active for a bit if one or more indications indicates that the bit correspond to a CAN frame. The control signal generator 206 may then provide to the bus load monitor 104 one or more indications of whether the CAN bus 116 is idle or active for the bit. In an example, one or more indications output by the state snooper 204 which is at the baud rate or less than the baud rate may be the snooped states which indicates whether each bit of one or more bits detected corresponds to a CAN frame. In other examples, one or more indication output by the state snooper 204 which is at less than the baud rate may be an indication of a change in the snooped states which indicates whether each bit of one or more bits detected corresponds to a CAN frame.

Example timeline 208 illustrates the operation of the state machine snooper 204 in more detail. The timeline shows a plurality of time instances labeled as 1-20 when a respective bit is detected on the CAN bus 116 by the CAN node 100. Each bit detected may correspond to a time interval over which the bit is detected on the CAN bus 116 (i.e., bit time interval) and each bit time interval may be assigned a number. The example bit that is detected is illustrated as "0" or "1" in the example timeline 208 at bit time intervals 1-20. The state of the one or more state machines 110 may also indicate to the state machine snooper 204 whether the one or more bits detected is associated with a CAN frame. In an example, bits at bit time intervals 1-5 may be associated with a CAN frame and bits at bit time intervals 6-20 may not be associated with a CAN frame. The state machine snooper 204 may provide to the control signal generator 206 the indication of one or more bits and for each bit of the one or more bits whether the bit is associated with a CAN frame. Based on the indication, the control signal generator 206 may identify that the CAN bus 116 is idle or active for each bit detected, e.g., idle for bit time intervals of bits detected between bit time intervals 6-20 and active for bit time intervals of bits detected between bit time intervals 1-5 in the example timeline 208, which is then provided to the bus load monitor 104 to determine the bus load on the CAN bus 116. The bus load may be based on a sum of the time of the bit time intervals over which bits are detected in bit time intervals 1-5 compared to a sum of time of the bit time intervals 6-20 in this example.

Figure 3:
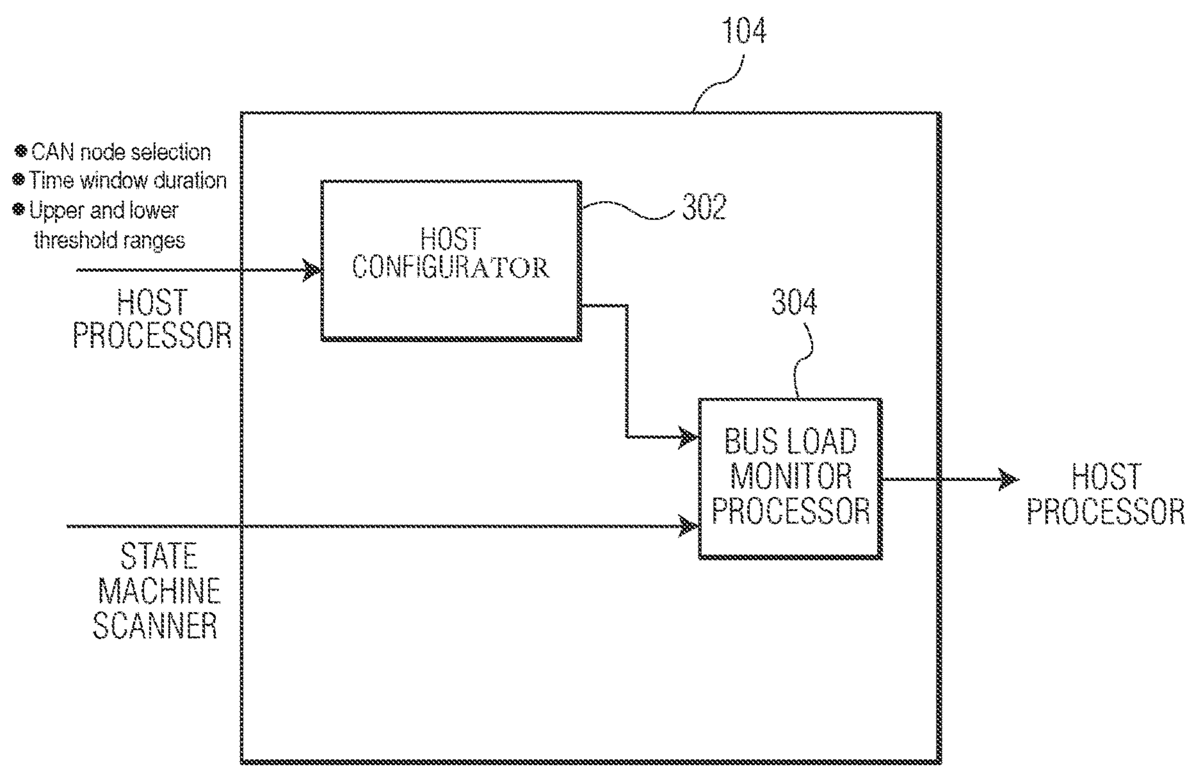
FIG. 3 is an example block diagram of a bus load monitor of the CAN node in accordance with an embodiment.

FIG. 3 is an example block diagram of the bus load monitor 104 of the CAN node 100 in accordance with an embodiment. The bus load monitor 104 may have a host configurator 302 and a bus load monitor processor 304 which are communicatively coupled together. The host configurator 302 may be coupled to the host processor 118 and receive from the host processor 118 an indication of a time window duration of a time window over which the bus load is to be determined. Each CAN node on the CAN bus 116 may be configured to determine bus load. In some examples, the host processor 118 may select the CAN node which is to provide the indication of bus load, such as a CAN node which has available processing power to determine bus load. Further the bus load monitor processor 304 may receive from the SMS 108 one or more indications of whether the CAN bus 116 is idle or active for each bit of one or more bits detected on the CAN bus 116. The bus load monitor processor 304 may determine how long the CAN bus 116 is active or idle over the time window to determine the bus load based on one or more indications. The reference clock 122 may generate a clock signal which is used to increment a counter at a predefined rate. The bus load monitor 104 may determine a start of the time window based on first count of the counter. The bus load monitor 104 may then receive indications whether the CAN bus 116 is idle or active for corresponding bits detected in the time window until the end of the time window as indicated by a second count of the counter. The bus load monitor processor 304 may calculate a time that the CAN bus 116 is active which is an indication of bus load for the time window. This process may be repeated for a plurality of time windows and an average bus load may be determined based on an average of the time the CAN bus 116 is active in each of the different time windows. The bus load monitor processor 304 may also compare the bus load for a time window or the average bus loading to one or more thresholds such as a high threshold and low threshold. The bus load monitor processor 304 may provide an indication to the host processor 118 if the bus load is above the high threshold which indicates an excessive bus load or below the low threshold which indicates an under-utilization of the CAN bus 116.

Example Methods

Figure 4:
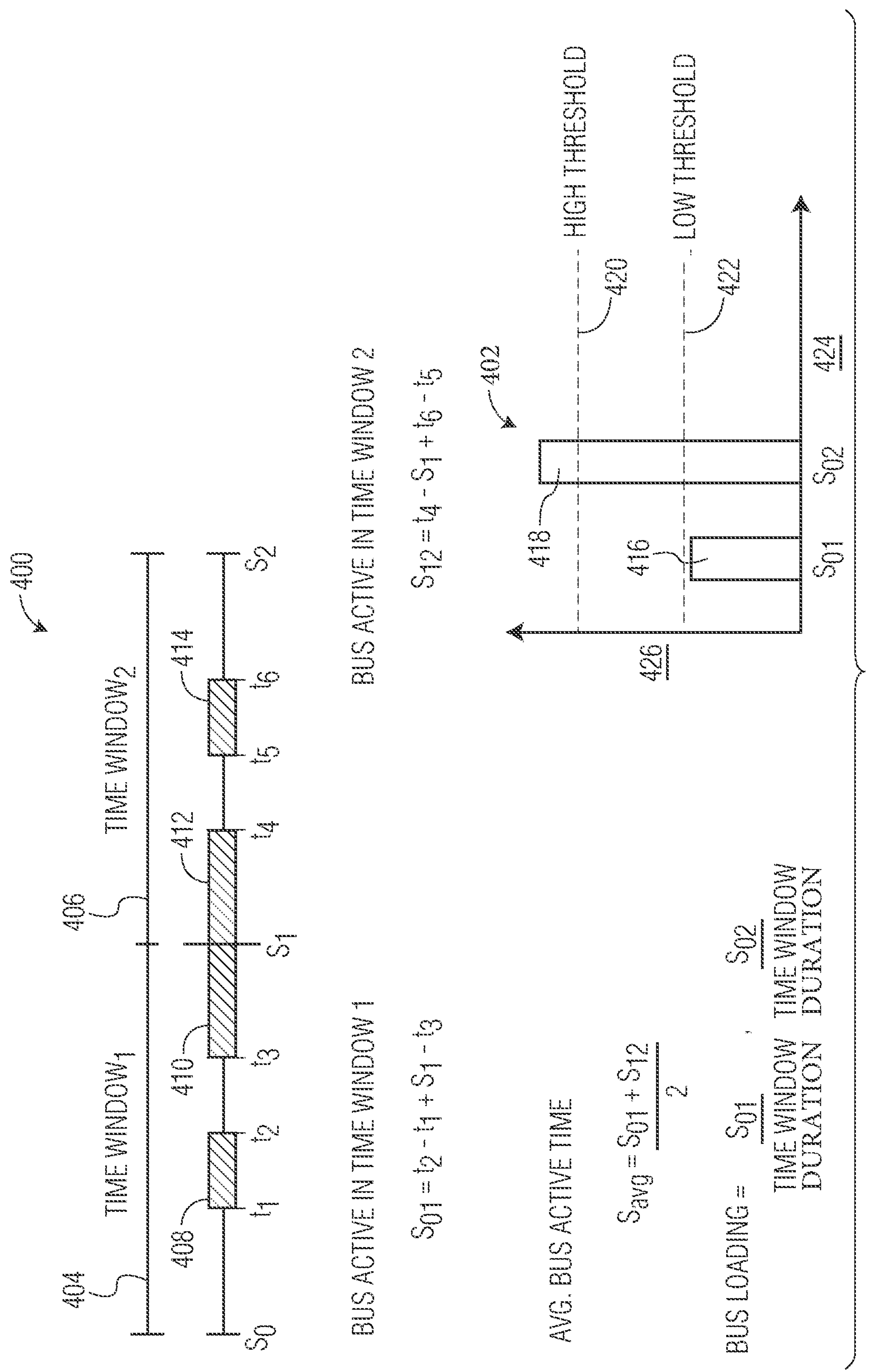
FIG. 4 illustrates a process for determining a bus load of the CAN bus in accordance with an embodiment.

FIG. 4 illustrates a process for determining the bus load of the CAN bus 116 in a period of time 400 in accordance with an embodiment. The host processor 118 may define a time window duration of a time window and the period of time 400 may be segmented into one or more time windows, examples of which are shown as 404, 406 defined by bit time intervals. The time window may be a time over which the bus load monitor processor 304 is to determine bus load. The time window 404 may be defined by a start time $S_0$ plus the time window duration. For example, the time window 404 is bounded by a start time $S_0$ and end time $S_1$ with the time window duration. In another example, a time window 406 is bounded by a start time $S_1$ and end time $S_2$ with the time window duration. The bus load monitor processor 304 may determine the start time $S_0$ based on a start count of the counter and based on the start time $S_0$ and the time window duration, determine the end time $S_1$ and an end count of what the count of the counter will be at the end time $S_1$. Within the time window 404 as indicated by the count of counter between the start count and end count, the bus load monitor processor 304 may determine at different times whether the CAN bus 116 is active or idle as indicated by the state machine scanner 108. The time that the CAN bus 116 is idle may be determined by summing the time of bit time intervals not associated with frame bit and indicated by lack of shading (e.g., time between $S_0$ and $t_1$ and $t_2$ to $t_3$) and the time when the CAN bus 116 is active by summing the time of bit time intervals associated with frame bits and indicated by shading (e.g., $t_1$ to $t_2$ and $t_3$ to $t_4$) in an example. The bus load monitor processor 304 may determine a time that the CAN bus 116 is active ($S_{01}$) in the time window based on determining the one or more time segments 408, 410 that the CAN bus 116 is active within the time window 404 and summing the time of the time segments for the time window. This process may be repeated for one or more time windows such as time window 406 which begins at time $S_1$ with a duration of the time window duration to end at $S_2$ to determine the time that the CAN bus 116 is active between $S_1$ and $S_2$ shown as $S_2$ by summing the time of the time segments 412, 414 in the time window 406. The time that the CAN bus 116 is active for one or more time windows may also be averaged to provide an average time that the bus is active over a plurality of time windows shown as $S_{avg}$ or bus load. In some examples, the bus load may be computed as the active time in a time window divided by the time window duration which is indicative of a percentage of time that the CAN bus 116 is active in an example.

In an example, the bus load monitor processor 304 may generate a bar graph 402 which indicates a bus load for each time window 404, 406, which is shown as bus load 416 and bus load 418. The axis 424 may identify a time window and the axis 426 may indicate a bus load for a time window. The bus load may be compared to one or more thresholds, which are shown as a high threshold 420 and a low threshold 422. If a bus load exceeds the high threshold 420 or falls below the low threshold 422, then the bus load monitor processor 304 may provide an indication of breach to the host processor 118 such as an interrupt signal to cause the host processor 118 to take an action. Based on the upper threshold 420 being breached, e.g., within the time window 406 indicated as $S_2$, the host processor 118 may determine a CAN node is not fairly allowing other CAN nodes to communicate on the CAN bus 116 or there is an external attack on the CAN bus 116. Based on the lower threshold 422 being breached e.g., within the time window 416 indicated as $S_0$, the host processor 118 may determine a CAN node is malfunctioning and not able to communicate with the CAN bus 116 which could produce a safety concern. In the case that the CAN bus 116 is in a vehicle, the host processor 118 may responsively cause a notification to be presented on an instrument panel of the vehicle based on the threshold breach. Further, based on the bus load, the host processor 118 may be able to balance usage of one or more CAN nodes by changing the CAN bus which a CAN node uses to communicate or a frequency of transmission of CAN frames in an example.

Figure 5A:
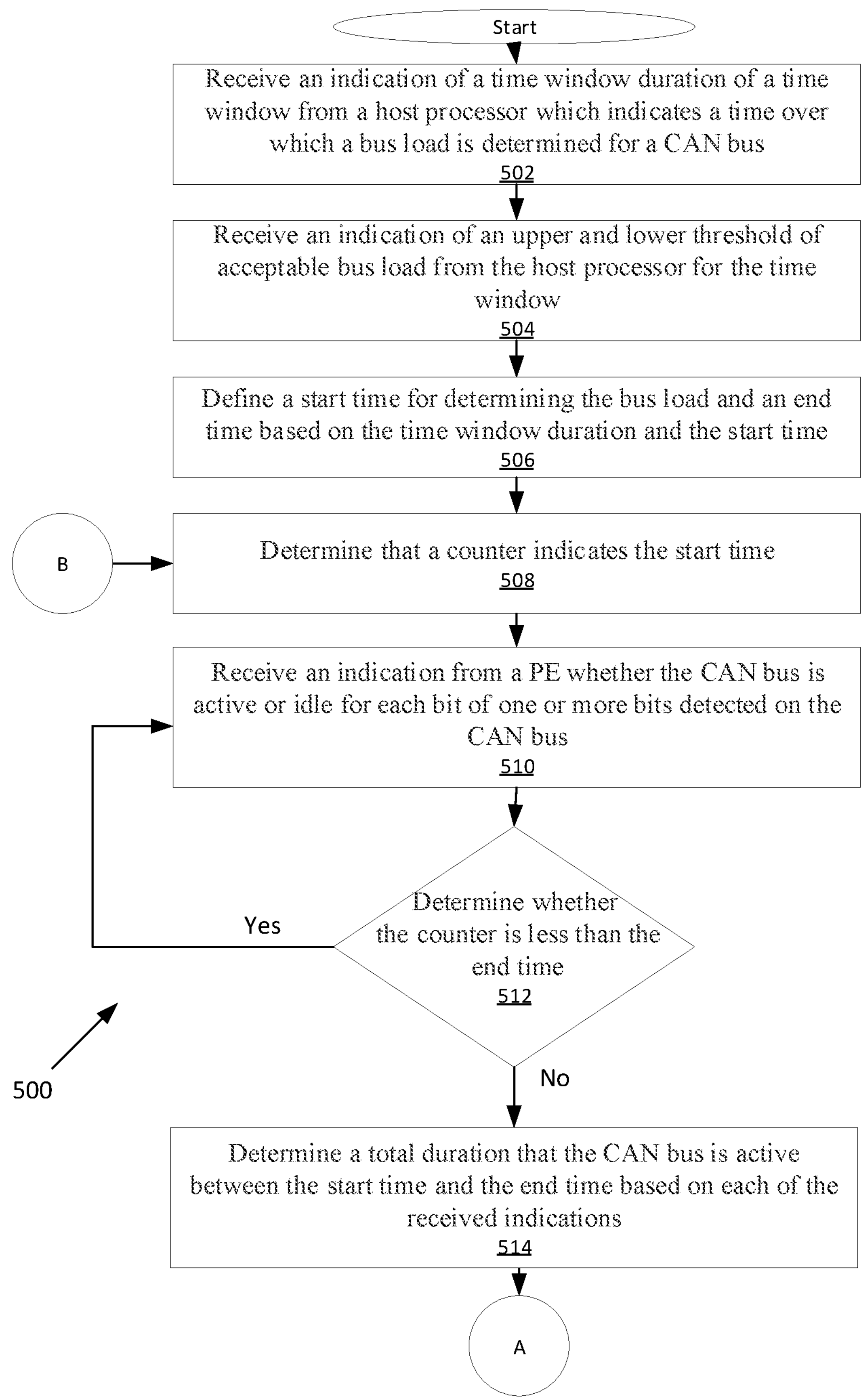
FIGS. 5A & 5B define a flow chart of functions associated with determining the bus load of the CAN bus in accordance with an embodiment.
Figure 5B:
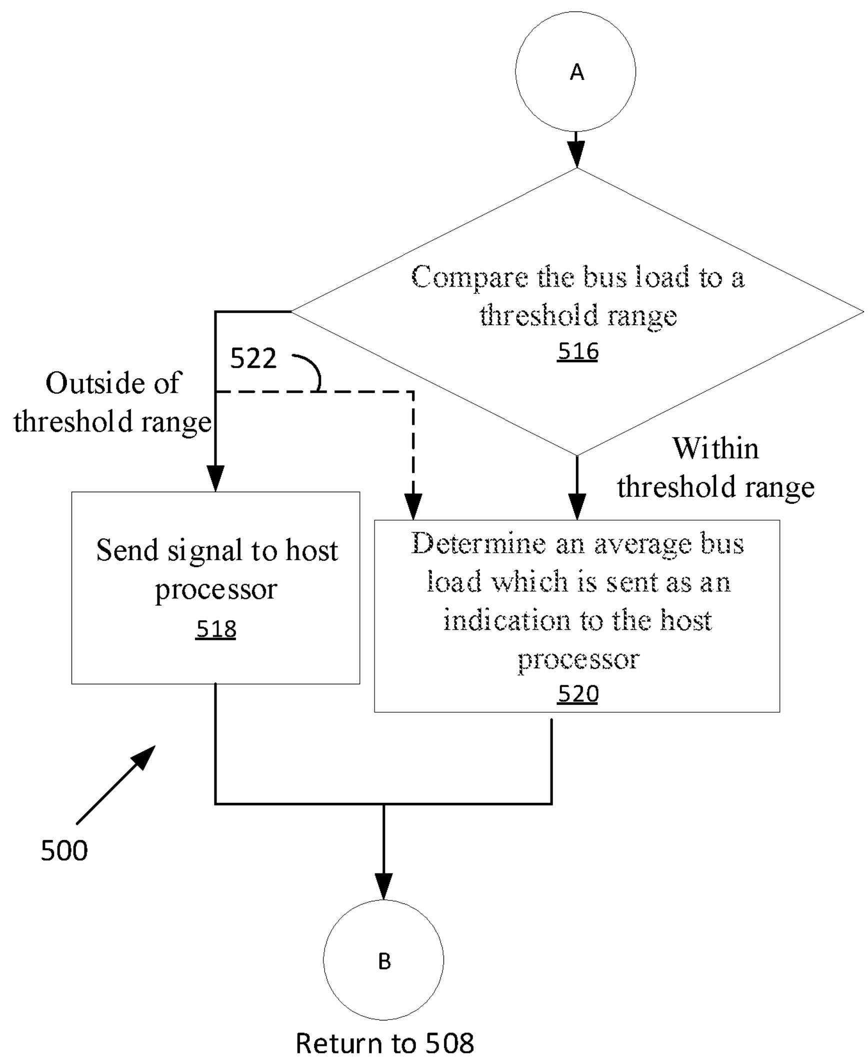

FIGS. 5A & 5B define a flow chart 500 of functions associated with determining the bus load of a CAN bus 116 in accordance with an embodiment. The functions may be performed by the bus load monitor 104 in an example. At 502, an indication of a time window duration of a time window is received from a host processor which indicates a period of time over which a bus load is determined for a CAN bus. At 504, an indication of an upper and lower threshold of acceptable bus load is received from the host processor for the time window. At 506, a start time for determining the bus load and an end time based on the time window duration and start time are defined. At 508, a determination is made that a counter indicates the start time. At 510, an indication is received from a PE whether the CAN bus 116 is active or idle for each bit of one or more bits detected on the CAN bus 116. The indication is based on a state machine snooper 204 snooping one or more state machines of the PE to determine whether each bit of one or more bits detected on the CAN bus 116 are associated with a CAN frame. If a bit corresponds to a CAN frame, then the CAN bus 116 is active, otherwise, the CAN bus 116 is idle which is indicated by the control signal generator 206 to the bus monitor processor 304. In an example, the one or more bits detected may correspond to a portion of bits in a CAN frame such as a field of the CAN frame or stuff bit or a string of bits following the CAN frame. Further, each bit may be detected over a bit time interval. At 512, if the count of the counter is less than the end time, processing returns to 510 to receive another indication of whether the CAN is active or idle for each bit of another one or more bits detected on the CAN bus. At 512, if the count of the counter is not less than the end time, processing continues to 514 to determine the bus load. At 514, a determination is made of a total duration that the CAN bus is active between the start time and the end time based on each of the received indications. The total duration that the CAN bus is active may be based on identifying within the time window a sub-duration (e.g., time segment) over which one or more bits are detected which are associated with a CAN frame and summing the corresponding bit time intervals over which the one more bits are detected. In an example, the time window may have a plurality of these sub-durations which are summed to define the total duration. At 516, the bus load is compared to the upper and lower threshold ranges. If the bus load exceeds the upper threshold range or falls below the lower threshold range, at 518, a signal is sent to the host processor 118. In an example, the signal may be an interrupt signal to the host processor 118 to cause the host processor 118 to take an action. If the bus load is within the threshold range, then at 520, an average bus load is determined by averaging the bus load for the time window with a bus load of an earlier time window which is then sent to the host processor 118 as an indication. In some examples, the bus load monitor 104 may also send the bus load for a time window to the host processor 118. In other examples, the bus load monitor 104 may optionally also send the average bus load when the bus load is outside of the threshold range as shown by a dotted line 522. Processing then returns back to 508 to determine a bus load for another time window. The next sampling window may automatically start based on last end time and the configured time window in an example.

In an embodiment, a method for determining by a controller area network (CAN) node coupled to a host processor a bus load on a CAN bus is disclosed. The method comprises: receiving from the host processor an indication of a time window duration of a time window and a threshold range for acceptable bus load in the time window; defining a start time and an end time for determining the bus load based on the start time and the time window duration; determining whether the CAN bus is active or idle for each bit of one or more bits detected on the CAN bus between the start time and the end time determining the bus load over the time window based on whether the CAN bus is active or idle for each bit of the one or more bits detected on the CAN bus between the start time and the end time; comparing the bus load to the threshold range; and sending a signal to the host processor if the bus load exceeds or fails below the threshold range. In an example, the method further comprises determining the bus load over another time window which does not overlap in time with the time window and averaging the bus load of the time window and the other time window to determine an average bus load which is provided to the host processor. In an example, the CAN node which is coupled to a vehicle system of a vehicle further transmits or receives a CAN frame comprising data from the vehicle system over the CAN bus. In an example, the method further comprises receiving a selection indication from a host processor to select the CAN node from a plurality of CAN nodes of the CAN bus to determine the bus load on the CAN bus. In an example, determining whether the CAN bus is active or idle comprises snooping one or more states of one or more state machines of a protocol engine of the CAN node which indicate for each bit of the one or more bits detected on the CAN bus whether the bit corresponds to a CAN frame. In an example, each bit is detected over a bit time interval; and wherein determining the total duration that the CAN bus is active between the start time and the end time comprises determining a sum of time of the bit time intervals corresponding to the detected bits associated with when CAN bus is active. In an example, the method further comprises adjusting a number of CAN nodes on the CAN bus based on the bus load. In an example, the method further comprises sending an indication of the bus load to the host processor. In an example, the determination of whether the CAN bus is active or idle is based on determining for each bit of the one or more bits detected on the CAN bus whether the bit corresponds to a CAN frame.

In another embodiment, a controller area network (CAN) node is disclosed comprising: a host processor interface; and a bus load monitor; wherein the host processor interface communicatively couples a host processor to the bus load monitor; and wherein the bus load monitor is arranged to receive from the host processor an indication of a time window duration of a time window and a threshold range for acceptable bus load in the time window; define a start time and an end time for determining a bus load based on the start time and the time window duration; determine whether the CAN bus is active or idle for each bit of one or more bits detected on the CAN bus between the start time and the end time; determine the bus load over the time window based on whether the CAN bus is active or idle for each bit of the one or more bits detected on the CAN bus between the start time and the end time; compare the bus load to the threshold range; and send a signal to the host processor if the bus load exceeds or falls below the threshold range. In an example, the bus load monitor is further arranged to determine the bus load over another time window which does not overlap in time with the time window and average the bus load of the time window and the other time window to determine an average bus load which is provided to the host processor. In an example, the CAN node which is coupled to a vehicle system of a vehicle is further arranged to transmit or receive a CAN frame comprising data from the vehicle system over the CAN bus. In an example, the bus load monitor is further arranged to receive a selection indication from a host processor to select the CAN node from a plurality of CAN nodes of the CAN bus to determine the bus load over the CAN bus. In an example, the bus load monitor arranged to determine whether the CAN bus is active or idle comprises the bus load monitor arranged to snoop one or more states of one or more state machines of the protocol engine which indicate for each bit of the one or more bits detected on the CAN bus whether the bit corresponds to a CAN frame. In an example, each bit is detected over a bit time interval; and wherein the bus load monitor arranged to determine the total duration that the CAN bus is active between the start time and the end time comprises determining a sum of time of the bit time intervals corresponding to the detected bits associated with when the CAN bus is active. In an example, the bus load monitor is further arranged to adjust a number of CAN node on the CAN bus based on the bus load. In an example, the bus load monitor is further arranged to send an indication of the bus load to the host processor. In an example, the bus load monitor arranged to determine whether the CAN bus is active or idle is based on determining for each bit of the one or more bits detected on the CAN bus whether the bit corresponds to a CAN frame.

In yet another embodiment, a bus load monitor of a controller area network (CAN) node is disclosed which is arranged to receive from a host processor an indication of a time window duration of a time window and a threshold range for acceptable bus load in the time window; define a start time and an end time for determining a bus load based on the start time and the time window duration; detect that a counter indicates the start time; receive an indication from a protocol engine (PE) of the CAN node whether the CAN bus is active or idle for bit each of one or more bits detected on the CAN bus; determine whether the counter indicates the end time; based on the counter not indicating the end time, receive another indication of whether the CAN bus is active or idle for each one of another one or more bits detected on the CAN bus; based on the counter indicating the end time, determine the bus load over the time window based on whether the CAN bus is active or idle for each bit of the one or more bits detected on the CAN bus between the start time and the end time; compare the bus load to the threshold range; and send a signal to the host processor if the bus load exceeds or falls below the threshold range. In an example, the CAN node is further arranged to transmit and receive a CAN frame over the CAN bus.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for determining by a controller area network (CAN) node coupled to a host processor a bus load on a CAN bus, the method comprising:

receiving from the host processor an indication of a time window duration of a time window and a threshold range for acceptable bus load in the time window;

defining a start time and an end time for determining the bus load based on the start time and the time window duration;

snooping states of a state machine in a protocol engine (PE) of the CAN node for each bit of one or more bits detected on the CAN bus between the start time and the end time;

determining the bus load over the time window based on the snooped states, the snooped states indicating whether the CAN bus is active or idle for each bit of the one or more bits detected on the CAN bus between the start time and the end time, wherein the CAN bus is active when the bit corresponds to the CAN frame and idle when the bit does not correspond to the CAN frame;

comparing the bus load to the threshold range; and sending a signal to the host processor if the bus load exceeds or falls below the threshold range.

2. The method of claim 1, further comprising determining the bus load over another time window which does not overlap in time with the time window and averaging the bus load of the time window and the other time window to determine an average bus load which is provided to the host processor.

3. The method of claim 1, wherein the CAN node which is coupled to a vehicle system of a vehicle further transmits or receives a CAN frame comprising data from the vehicle system over the CAN bus.

4. The method of claim 1, further comprising receiving a selection indication from a host processor to select the CAN node from a plurality of CAN nodes of the CAN bus to determine the bus load on the CAN bus.

5. The method of claim 1, wherein each bit is detected over a bit time interval; and wherein determining the total duration that the CAN bus is active between the start time and the end time comprises determining a sum of time of the bit time intervals corresponding to the detected bits associated with when CAN bus is active.

6. The method of claim 1, further comprising adjusting a number of CAN nodes on the CAN bus based on the bus load.

7. The method of claim 1, further comprising sending an indication of the bus load to the host processor.

8. The method of claim 1, wherein the host processor causes the CAN node to use another CAN bus for communication based on the bus load.

9. The method of claim 1, wherein the host processor causes a diagnostic function of the CAN node to be performed if the bus load falls below the threshold range.

10. A controller area network (CAN) node comprising:

a host processor interface; and a bus load monitor;

wherein the host processor interface communicatively couples a host processor to the bus load monitor; and wherein the bus load monitor is arranged to receive from the host processor an indication of a time window duration of a time window and a threshold range for acceptable bus load in the time window; define a start time and an end time for determining a bus load based on the start time and the time window duration; determine whether the CAN bus is active or idle for each bit of one or more bits detected on the CAN bus between the start time and the end time based on snooping states of a state machine in a protocol engine (PE) of the CAN node; determine the bus load over the time window based on whether the CAN bus is active or idle for each bit of the one or more bits detected on the CAN bus between the start time and the end time, wherein the CAN bus is active when the bit corresponds to the CAN frame and idle when the bit does not correspond to the CAN frame; compare the bus load to the threshold range; and send a signal to the host processor if the bus load exceeds or falls below the threshold range.

11. The node of claim 10, wherein the bus load monitor is further arranged to determine the bus load over another time window which does not overlap in time with the time window and average the bus load of the time window and the other time window to determine an average bus load which is provided to the host processor.

12. The node of claim 10, wherein the CAN node which is coupled to a vehicle system of a vehicle is further arranged to transmit or receive a CAN frame comprising data from the vehicle system over the CAN bus.

13. The node of claim 10, wherein the bus load monitor is further arranged to receive a selection indication from a host processor to select the CAN node from a plurality of CAN nodes of the CAN bus to determine the bus load over the CAN bus.

14. The node of claim 10, wherein each bit is detected over a bit time interval; and wherein the bus load monitor arranged to determine the total duration that the CAN bus is active between the start time and the end time comprises determining a sum of time of the bit time intervals corresponding to the detected bits associated with when the CAN bus is active.

15. The node of claim 10, wherein the bus load monitor is further arranged to adjust a number of CAN node on the CAN bus based on the bus load.

16. The node of claim 10, wherein the bus load monitor is further arranged to send an indication of the bus load to the host processor.

17. The CAN node of claim 10, wherein the host processor causes the CAN node to use another CAN bus for communication based on the bus load.

18. The CAN node of claim 10, wherein the host processor causes a diagnostic function of the CAN node to be performed if the bus load falls below the threshold range.

19. A bus load monitor of a controller area network (CAN) node is arranged to receive from a host processor an indication of a time window duration of a time window and a threshold range for acceptable bus load in the time window; define a start time and an end time for determining a bus load based on the start time and the time window duration; detect that a counter indicates the start time; receive an indication from a protocol engine (PE) of the CAN node whether the CAN bus is active or idle for each bit of one or more bits detected on the CAN bus based on snooping states of a state machine in the PE of the CAN node, wherein the CAN bus is active when the bit corresponds to the CAN frame and idle when the bit does not correspond to the CAN frame; determine whether the counter indicates the end time; based on the counter not indicating the end time, receive another indication of whether the CAN bus is active or idle for each bit of another one or more bits detected on the CAN bus based on snooping states of the state machine in the PE of the CAN node; based on the counter indicating the end time, determine the bus load over the time window based on whether the CAN bus is active or idle for each bit of the one or more bits detected on the CAN bus between the start time and the end time; compare the bus load to the threshold range; and send a signal to the host processor if the bus load exceeds or falls below the threshold range.

20. The bus load monitor of claim 19, wherein the CAN node is further arranged to transmit and receive a CAN frame over the CAN bus.

21. The bus load monitor of claim 19, wherein the host processor causes the CAN node to use another CAN bus for communication based on the bus load.

22. The bus load monitor of claim 19, wherein the host processor causes a diagnostic function of the CAN node to be performed if the bus load falls below the threshold range.

* * * * *